Figure 6:
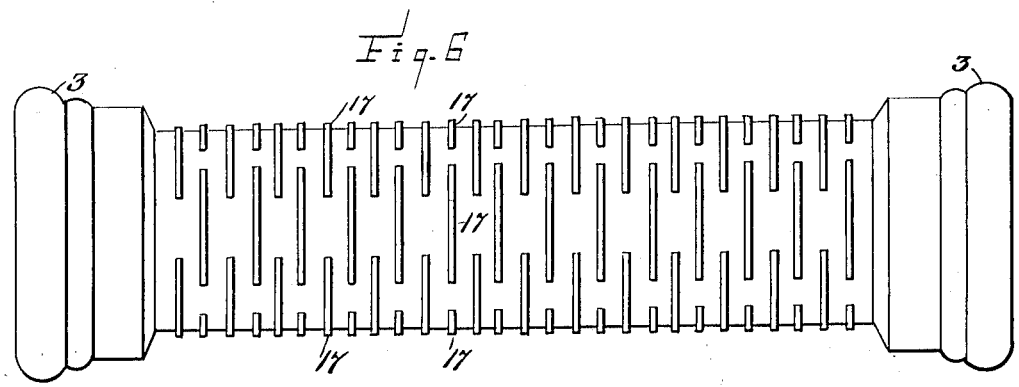

C. R. SCHMIDT.
CAST IRON PIPE.
APPLICATION FILED DEC. 9, 1908.
950,578.
Patented Mar. 1, 1910.
2 SHEETS—SHEET 1.
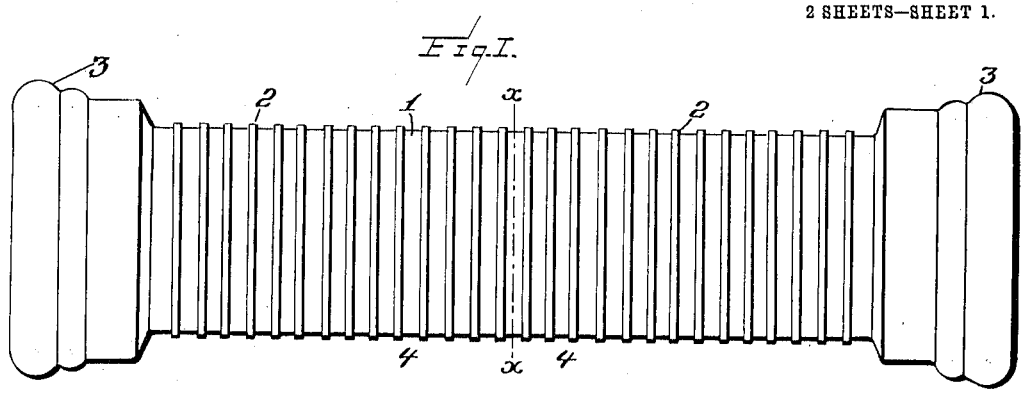
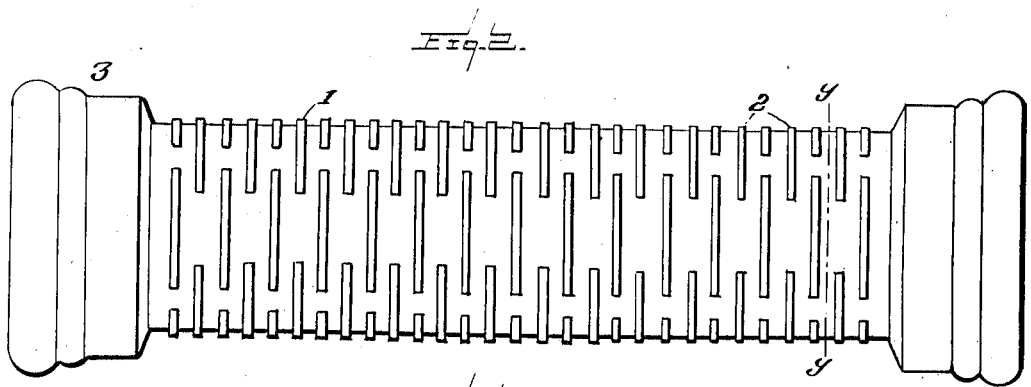
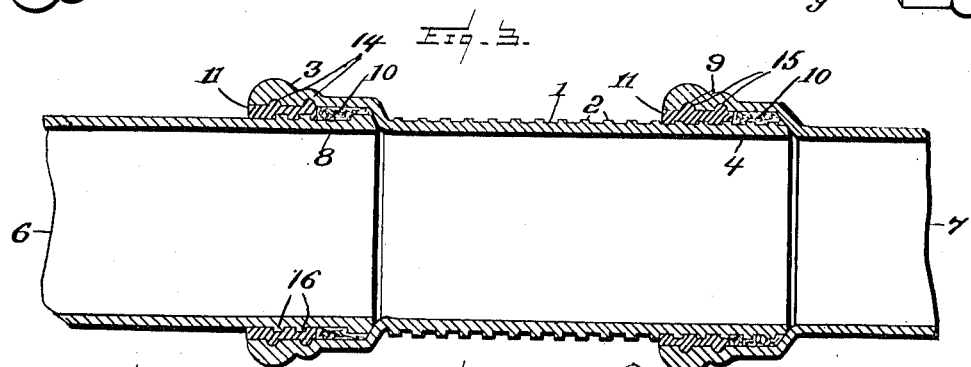
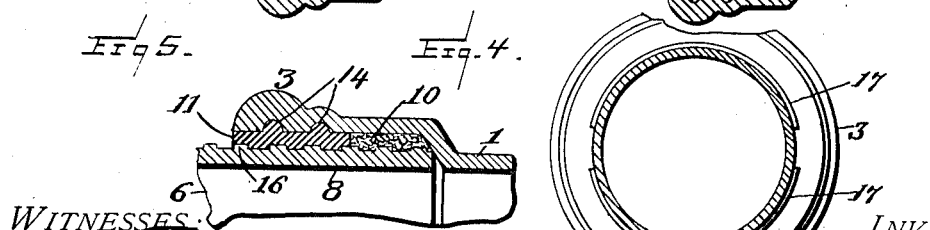
WITNESSES
INVENTOR
Charles R. Schmidt
BY Connally Bros.
Attorneys

C. R. SCHMIDT.
CAST IRON PIPE.
APPLICATION FILED DEC. 9, 1908.

950,578.

Patented Mar. 1, 1910.
2 SHEETS—SHEET 2.

WITNESSES
I. P. Hines.
A. B. Byrne

INVENTOR
Charles R. Schmidt
by Connolly Bros. Attorneys

UNITED STATES PATENT OFFICE.

CHARLES R. SCHMIDT, OF BALTIMORE, MARYLAND.

CAST-IRON PIPE.

950,578.  Specification of Letters Patent.  Patented Mar. 1, 1910.

Application filed December 9, 1908. Serial No. 466,670.

*To all whom it may concern:*

Be it known that I, CHARLES R. SCHMIDT, a citizen of the United States, residing at Baltimore, State of Maryland, have invented certain new and useful Improvements in Cast-Iron Pipes, of which the following is a specification.

This invention has relation to cast iron pipes and relates in particular to straight pipes having a bell, faucet, or receiving member at one or both ends.

My invention has for its object the provision of means whereby when a pipe is cut to whatever length is required it cannot split or crack longitudinally or very irregularly as is often the case unless very great care is exercised or the iron is very soft. Further the spigot or entering end of the pipe will always have, adjacent to its extremity, a rib or flange which will prevent the lead with which the joint is packed from "creeping" out of the bell when repeatedly expanded by the heated or warmed soil pipe, when used as a soil pipe, or prevent the lead from being forced out of the joint by high pressure when the pipe is used in water lines.

In carrying my invention into effect I provide each section of pipe with a bell or faucet at one or both ends and with a series of integral external flanges so that when the pipe is cut to the required length there will always be one or more flanges or ribs adjacent to the end within the space covered by the lead in making the joint.

In the accompanying drawing Figure 1 is a side elevation of my improvement, as applied to a pipe having two bell or faucet ends. Fig. 2 is a similar view of a pipe of modified construction. Fig. 3 is a sectional view showing the pipe cut off and inserted in position between two adjacent sections of pipe. Fig. 4 is a transverse sectional view of the pipe shown in Fig. 2. Fig. 5 is an enlarged sectional view of part of the joint shown in Fig. 3.

The pipe shown in Fig. 1, is composed of the straight cylindrical body portion 1 having a series of integral external ribs or flanges 2, located at any suitable distance apart and preferably at regular distances one from the other. The body portion 1, has at each end a bell, faucet or receiving member 3, of any desired external and internal configuration, such bell ends being adapted to receive the spigot end of an adjacent section of pipe. The pipe shown in Fig. 1 is not intended to be used in practice in the form shown, but is to be cut off at any desired point and then constitutes two pieces of pipe each having a bell, faucet or receiving member 3, at one end and a straight portion 4, constituting a spigot or entering member at the other end, such spigot or entering member having a flange at or near its extremity to facilitate the formation of a fluid or gas tight joint in connection with the bell, faucet, or receiving end of an adjacent pipe section. For instance the pipe shown in Fig. 1 can be cut off on the line $x$—$x$, and leave two pieces of pipe of equal length each having a bell or receiving end 3 and a spigot or entering end 4, and having adjacent each spigot end one or more of the flanges 2. The pipe shown in Fig. 1, could of course, be cut off between any two of the flanges 2 and thus leave two pipes of unequal length. The pipe shown in Fig. 2 is the same as the pipe shown in Fig. 1 except that it has only one bell end and the pipe shown in Fig. 2 is either used entire or cut off to the required length between any two of the flanges 2, thus leaving two pieces, one of which has a bell or faucet at one end and a spigot at the other end.

In Figs. 3 and 5 I have shown the manner in which my improved pipe is used in connection with adjacent sections of pipe, one having a bell or faucet end and the other a spigot end.

The section of pipe produced by cutting off to the required length one of the forms shown in Fig. 1 or in Fig. 2 is interposed between two sections of pipe 6 and 7, the bell or faucet end of the interposed section of pipe receiving the spigot end 8 of pipe section 6 and the spigot end 4 of the interposed section of pipe entering the bell or faucet end 9 of the pipe section 7. When the interposed section has been placed in position as shown in Fig. 3, the bell or faucet 3 of the interposed section is packed with fibrous material 10 and a lead packing 11 around the spigot end 8 and fibrous material 12 and a lead packing 13 are packed into the bell 9 of the section 7 and around the spigot end 4 of the interposed section of pipe.

It will be observed that my improved pipe when cut off as described, has the decided advantage over pipe of the ordinary character that the portion which constitutes the spigot end of the pipe is always provided with one or more flanges adjacent its extremity which enter the bell or faucet end of the adjacent pipe section and serve as an anchorage for the lead packing and as a stop to the fibrous portion of the packing permitting it to be wedged tight on a smooth pipe wall.

The bell or faucet of my improved pipe is preferably formed with internal grooves 14, as shown in Figs. 3 and 5 and the bell or faucet end 9 of the pipe 7, with which my improved pipe is connected is preferably formed with similar grooves 15, while the spigot end 8 of the pipe section 6 is preferably formed with external ribs 16. The ribs on the spigot end of one section of pipe and the grooves in the bell end of the adjacent section of pipe coact in the formation of a gas and water tight joint, as the lead packing,—which is poured into the joint in molten condition,—in shrinking during the hardening process, will draw up against and firmly clasp a plurality of abutments or anchorage surfaces presented by the grooves and ribs above referred to, so as to produce a tight joint.

The ribs or flanges on the pipe shown in Fig. 2, do not need to extend up close to the bell or faucet 3, as this form is intended to be employed where a comparatively long section of my improved pipe is to be interposed between two other sections of pipe, the pipe shown in Fig. 2, being cut off at some point nearer to the spigot end than to the bell end, say, for instance, on the line $y$—$y$. I have accordingly shown the ribs or flanges in Fig. 2, located adjacent the spigot end, the remainder of the pipe being plain or devoid of ribs or flanges. In the form shown in Fig. 4 and Fig. 6 the ribs or flanges instead of being continuous and extending entirely around the pipe, are fractional ribs or flanges, that is to say, each flange is composed of several segregated sections 17.

I claim:

1. A cast iron, one-piece pipe having a receiving member at each end and formed with integral circumferential ribs between the receiving members.

2. A cast iron, one-piece pipe having a receiving member at each end and formed with integral, fractional, circumferential ribs between the receiving members.

In testimony whereof I have affixed my signature, in presence of two witnesses.

CHARLES R. SCHMIDT.

Witnesses:
J. B. CONNOLLY,
T. A. CONNOLLY.